(12) United States Patent
Whatmough et al.

(10) Patent No.: US 12,493,787 B2
(45) Date of Patent: Dec. 9, 2025

(54) SYSTEMS HAVING A PLURALITY OF NEURAL NETWORKS

(71) Applicant: Arm Limited, Cambridge (GB)

(72) Inventors: Paul Nicholas Whatmough, Cambridge, MA (US); Mark John O'Connor, Luebeck (DE)

(73) Assignee: Arm Limited, Cambridge (GB)

( * ) Notice: Subject to any disclaimer, the term of this patent is extended or adjusted under 35 U.S.C. 154(b) by 885 days.

(21) Appl. No.: 17/242,987

(22) Filed: Apr. 28, 2021

(65) Prior Publication Data

US 2022/0351033 A1 Nov. 3, 2022

(51) Int. Cl.
*G06V 10/82* (2022.01)
*G06F 18/214* (2023.01)
*G06N 3/045* (2023.01)
*G06N 3/08* (2023.01)

(52) U.S. Cl.
CPC ........... *G06N 3/08* (2013.01); *G06F 18/2148* (2023.01); *G06N 3/045* (2023.01); *G06V 10/82* (2022.01)

(58) Field of Classification Search
CPC ...... G06N 3/08; G06N 3/045; G06F 18/2148; G06V 10/82
See application file for complete search history.

(56) References Cited

U.S. PATENT DOCUMENTS

| | | | | |
|---|---|---|---|---|
| 11,498,500 B1* | 11/2022 | Pertsel | ................. | G05D 1/0088 |
| 11,657,264 B2* | 5/2023 | Cricri | ....................... | G06N 3/08 |
| | | | | 706/25 |
| 2017/0132528 A1* | 5/2017 | Aslan | ...................... | G06N 20/00 |
| 2019/0122073 A1* | 4/2019 | Ozdemir | ................ | G06V 20/56 |
| 2019/0230113 A1* | 7/2019 | Al Faruque | ............ | B33Y 99/00 |
| 2020/0004259 A1 | 1/2020 | Gulino et al. | | |
| 2020/0089653 A1* | 3/2020 | Hong | ................... | A61B 5/0008 |
| 2020/0134427 A1* | 4/2020 | Oh | ......................... | G06N 3/084 |
| 2021/0117760 A1* | 4/2021 | Krishnan | ................. | G06N 3/08 |
| 2021/0344745 A1* | 11/2021 | Mermoud | ................ | G06N 3/08 |
| 2021/0350231 A1* | 11/2021 | Look | ........................ | G06N 7/01 |
| 2022/0309771 A1* | 9/2022 | Schorn | .................. | G06N 3/045 |

(Continued)

OTHER PUBLICATIONS

"Ashukha Arsenii et al: ""Pitfalls of In-Domain Uncertainty Estimation andEnsembling in Deep Learning""", Jul. 17, 2020 (Jul. 17, 2020), XP055941596,DOI: https://doi.org/10.48550/arXiv.2002.06470Retrieved from the Internet: URL: https://arxiv.org/abs/2002.06470v3 [retrieved on Jul. 12, 2022]".

(Continued)

*Primary Examiner* — Beau D Spratt
(74) *Attorney, Agent, or Firm* — EIP US LLP

(57) ABSTRACT

A method of operating a system having a plurality of neural networks includes receiving sequential input data events and processing each sequential input data event using a corresponding subset of the plurality of neural networks to obtain a plurality of sequential outputs. Each sequential output is indicative of a predictive determination of an aspect of the corresponding input data event. The method includes processing the plurality of sequential outputs to determine an uncertainty value associated with the plurality of sequential outputs, and operating the system based on the determined uncertainty value.

17 Claims, 10 Drawing Sheets

| Time | Traffic Light | Neural Network 1 | | | Neural Network 2 | | | Neural Network 3 | | | Uncertainty |
|---|---|---|---|---|---|---|---|---|---|---|---|
| | | Red | Amber | Green | Red | Amber | Green | Red | Amber | Green | |
| 1 | Red | 0.98 | 0.00 | 0.02 | 0.98 | 0.01 | 0.01 | 0.95 | 0.00 | 0.05 | Low (0.98-0.95) |
| 2 | Red | 0.96 | 0.02 | 0.02 | 0.97 | 0.03 | 0.00 | 0.95 | 0.05 | 0.00 | Low (0.97-0.95) |
| 3 (obscured) | Red | 0.85 | 0.10 | 0.05 | 0.10 | 0.80 | 0.10 | 0.00 | 0.20 | 0.80 | High (0.85-0.00) |

(56) References Cited

U.S. PATENT DOCUMENTS

2023/0419079 A1* 12/2023 Shazeer ................. G06N 3/045

OTHER PUBLICATIONS

"Ruta Dymitr et al: ""An Overview of Classifier Fusion Methods"",Computing and Information Systems, vol. 7, Feb. 29, 2000 (Feb. 29, 2000),pp. 1-10, XP055941773,GBISSN: 1352-9404".

International Search Report and Written Opinion dated Jul. 27, 2022 for PCT Application No. PCT/GB2022/051066.

* cited by examiner

| Time | Traffic Light | Neural Network 1 | | | Neural Network 2 | | | Neural Network 3 | | | Uncertainty |
|---|---|---|---|---|---|---|---|---|---|---|---|
| | | Red | Amber | Green | Red | Amber | Green | Red | Amber | Green | |
| 1 | Red | 0.98 | 0.00 | 0.02 | 0.98 | 0.01 | 0.01 | 0.95 | 0.00 | 0.05 | Low (0.98-0.95) |
| 2 | Red | 0.96 | 0.02 | 0.02 | 0.97 | 0.03 | 0.00 | 0.95 | 0.05 | 0.00 | Low (0.97-0.95) |
| 3 (obscured) | Red | 0.85 | 0.10 | 0.05 | 0.10 | 0.80 | 0.10 | 0.00 | 0.20 | 0.80 | High (0.85-0.00) |

Fig. 4

| Time | Traffic Light | Neural Network 1 | | | Neural Network 2 | | | Neural Network 3 | | | Uncertainty |
|---|---|---|---|---|---|---|---|---|---|---|---|
| | | Red | Amber | Green | Red | Amber | Green | Red | Amber | Green | |
| 1 | Red | 0.98 | 0.00 | 0.02 | N/A | N/A | N/A | N/A | N/A | N/A | |
| 2 | Red | N/A | N/A | N/A | 0.97 | 0.03 | 0.00 | N/A | N/A | N/A | |
| 3 (obscured) | Red | N/A | N/A | N/A | N/A | N/A | N/A | 0.00 | 0.20 | 0.80 | High (0.98-0.00) |

Fig. 5

Conventional Ensembling

Method of Figures 8 and 9

SYSTEMS HAVING A PLURALITY OF NEURAL NETWORKS

BACKGROUND

Field of the Invention

The present disclosure relates to a method of operating a system comprising a plurality of neural networks, and a system comprising a plurality of neural networks.

Description of the Related Technology

Neural networks are employed in a wide range of applications such as image classification, speech recognition, character recognition, image analysis, natural language processing, gesture recognition and so forth, to make predictive determinations. Many different types of neural network such as Convolutional Neural Networks "CNN", Recurrent Neural Networks "RNN", Generative Adversarial Networks "GAN", and Autoencoders have been developed and tailored to such applications. To successfully operate in applications such as those mentioned above, neural networks are required to have a high degree of accuracy, and it may also be desirable to know the degree of certainty with which a predictive determination is made.

SUMMARY

According to a first aspect of the present disclosure there is provided a method of operating a system comprising a plurality of neural networks, the method comprising receiving sequential input data events, processing each sequential input data event using a subset of the plurality of neural networks to obtain a plurality of sequential outputs, each sequential output indicative of a predictive determination of an aspect of the corresponding sequential input data event, processing the plurality of sequential outputs to determine an uncertainty value associated with the plurality of sequential outputs, and operating the system based on the determined uncertainty value.

According to a second aspect of the present disclosure there is provided a system comprising a receiver for receiving sequential input data events, a plurality of neural networks, and a processor configured to: process each received sequential input data event using a corresponding subset of the plurality of neural networks to obtain a plurality of sequential outputs, each sequential output indicative of a predictive determination of an aspect of the corresponding sequential input data event; process the plurality of sequential outputs to determine an uncertainty value associated with the plurality of sequential outputs; and operate the system based on the determined uncertainty value.

According to a third aspect of the present disclosure there is provided a method of training a neural network to provide an uncertainty value for a predictive determination, the method comprising: processing sequential training input data events using a set of plurality of previously-trained neural networks to obtain a first set of sequential outputs, each sequential training input data event processed using each of the plurality of previously-trained neural networks, each sequential output of the first set of sequential outputs indicative of a predictive determination of an aspect of the corresponding sequential training input data event according to each of the previously-trained neural networks; determining an expected uncertainty value associated with each of the sequential outputs of the first set of sequential outputs; processing the sequential training input data events using a corresponding subset of the plurality of previously-trained neural networks to obtain a second set of sequential outputs, each sequential output of the second set of sequential outputs indicative of a predictive determination of an aspect of the corresponding sequential training input data event according to the corresponding subset of the previously trained neural networks; performing supervised learning on the neural network by utilising the second set of sequential outputs as input data for the neural network, and utilising the expected uncertainty values associated with each of the sequential outputs of the first set of sequential outputs as a target output, such that the neural network outputs an uncertainty value for each sequential output of the second set of sequential outputs.

Further features will become apparent from the following description, given by way of example only, which is made with reference to the accompanying drawings.

BRIEF DESCRIPTION OF THE DRAWINGS

FIG. 4 is a table illustrating results for conventional ensembling;

FIG. 5 is a table illustrating results for the method of FIG. 2;

DETAILED DESCRIPTION

Figure 1:
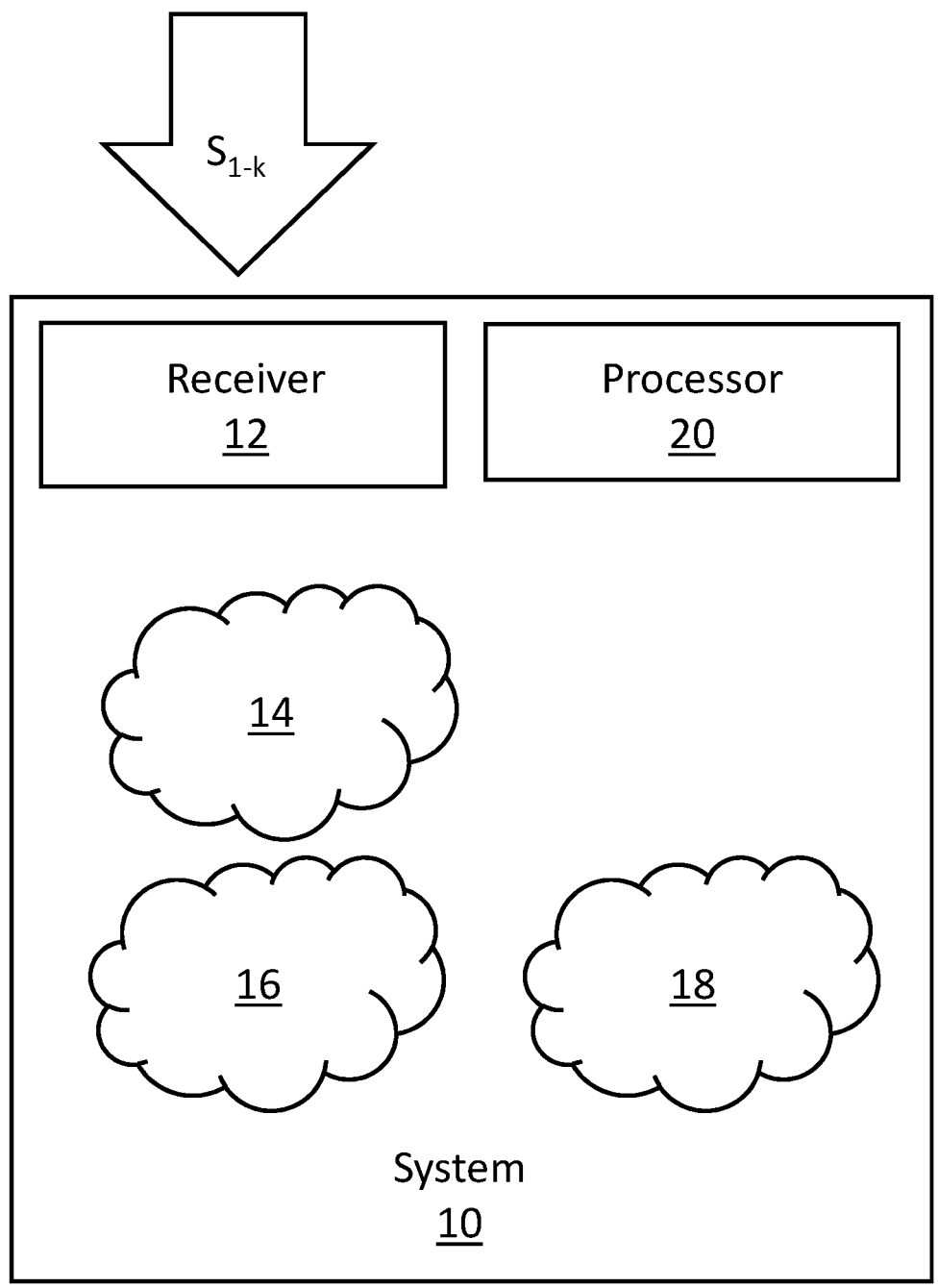
FIG. 1 is a schematic illustration of a system according to an example.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

In some examples herein, methods of operating a system comprising a plurality of neural networks comprise receiving sequential input data events, processing each sequential input data event using a subset of the plurality of neural networks to obtain a plurality of sequential outputs, each sequential output indicative of a predictive determination of an aspect of the corresponding sequential input data event, processing the plurality of sequential outputs to determine an uncertainty value associated with the plurality of sequential outputs, and operating the system based on the determined uncertainty value.

As each sequential input data event is processed using a subset of the plurality of neural networks, a computing requirement for processing the sequential input data events may be reduced compared to, for example, a system in which each of a plurality of neural networks are used to process each sequential input data event. In particular, it has previously been proposed to utilise so-called "ensembling" to provide a measure of uncertainty for predictive determinations made by a system having a plurality of neural networks. In a conventional ensemble of N neural networks, the N neural networks are run on each sequential input data event, with the distribution of the generated outputs monitored to provide a measure of uncertainty. The method described above may mitigate for this by processing each sequential data set with only a subset of the plurality of neural networks.

By reducing a computing requirement for processing the sequential input data events, the method may enable determination of an uncertainty value for systems having only limited computing resource which otherwise would not be able to use a conventional ensembling method. This may enable more accurate system operation, for example with the system recognising where a predicted determination has a relatively high level of uncertainty and taking appropriate action in view of the relatively high level of uncertainty. For example, if we consider an autonomous vehicle implementing the method described above, the autonomous vehicle may be able to slow down or stop where an object is detected with a high level of uncertainty to avoid accidental collisions. This may be preferable to an autonomous vehicle which does not have sufficient computing requirement to perform ensembling as mentioned above.

Alternatively, in systems with limited computing resource, ensembling may be performed, but with each input data event being processed by each neural network of the plurality of neural networks in a sequence, with the outputs monitored to determine an uncertainty value for each input data event. This can, however, lead to latency in provision of the uncertainty value, in view of having to process the input data events in a sequence using each neural network, which in turn leads to latency in taking action based on the uncertainty value. The method described above may mitigate for this by processing each sequential data set with only a subset of the plurality of neural networks. Taking the example above of an autonomous vehicle into consideration again here, an autonomous vehicle implementing the method described above may be able react sooner to slow down or stop where an object is detected with a high level of uncertainty to avoid accidental collisions than a similar vehicle in which ensembling is performed by processing each input data event with each neural network in a sequence.

By reducing a computing requirement for processing the sequential input data events, the method may enable a reduction in power consumption for the system. This may be particularly beneficial where the system is battery operated. Reduction of computing requirement may also reduce a burden on other systems that are provided to complement a processor, for example such as cooling systems or the like. Reduction of computing power may enable use of lower power and or smaller cooling systems, which may result in reduced power consumption for a system or improved form factor for the system, respectively.

It will further be appreciated that the method described above may lead to more accurate performance of the system with regard to the predictive determinations made. In particular, in conventional ensembling an uncertainty value may be obtained for each individual input data event, with those uncertainty values considered in isolation. In contrast, the method discussed above provides a temporal aspect to the uncertainty value, with the uncertainty value effectively smoothed over time.

In some examples herein, a system comprises a receiver for receiving sequential input data events, a plurality of neural networks, and a processor configured to: process each received sequential input data event using a subset of the plurality of neural networks to obtain a plurality of sequential outputs, each sequential output indicative of a predictive determination of an aspect of the corresponding sequential input data event; process the plurality of sequential outputs to determine an uncertainty value associated with the plurality of sequential outputs; and operate the system based on the determined uncertainty value.

Such a system may provide the same benefits as those described for the method above.

In some examples herein, methods of training a neural network to provide an uncertainty value for a predictive determination comprise: processing sequential training input data events using a set of plurality of previously-trained neural networks to obtain a first set of sequential outputs, each sequential training input data event processed using each of the plurality of previously-trained neural networks, each sequential output of the first set of sequential outputs indicative of a predictive determination of an aspect of the corresponding sequential training input data event according to each of the previously-trained neural networks; determining an expected uncertainty value associated with each of the sequential outputs of the first set of sequential outputs; processing the sequential training input data events using a corresponding subset of the plurality of previously-trained neural networks to obtain a second set of sequential outputs, each sequential output of the second set of sequential outputs indicative of a predictive determination of an aspect of the corresponding sequential training input data event according to the corresponding subset of the previously trained neural networks; performing supervised learning on the neural network by utilising the second set of sequential outputs as input data for the neural network, and utilising the expected uncertainty values associated with each of the sequential outputs of the first set of sequential outputs as a target output, such that the neural network outputs an uncertainty value for each sequential output of the second set of sequential outputs.

By performing supervised learning on the neural network by utilising the second set of sequential outputs as input data for the neural network, and utilising the expected uncertainty values associated with each of the sequential outputs of the first set of sequential outputs as a target output, the neural network may be trained to provide an uncertainty value similar to that which would be expected if conventional ensembling, where each input data event is operated on by each neural network, is performed.

To put these examples into context, FIG. 1 schematically illustrates a system 10 according to the present disclosure. Whilst referred to as a system, it will be appreciated that in some examples the system may be embodied as a device, for example an autonomous vehicle, a smart watch, a mobile device, or a smart doorbell, having the features described herein. The system 10 comprises a receiver 12, three neural networks 14,16,18 and a processor 20. Although illustrated separately in FIG. 1, it will be appreciated that in practice the three neural networks 14,16,18 may form part of the processor 20. The receiver 12 is any appropriate receiver for receiving sequential data input events, and examples will be described hereinafter. Similarly, the processor 20 is any suitable processor. In examples herein such as the example of FIG. 1, each of the three neural networks 14,16,18 has been trained on the same training data, albeit from a different initial starting point, and each neural network 14,16,18 is intended to provide a predictive determination of an aspect of sequential input data events received by the receiver 12.

The processor 20 is configured to process each received sequential input data event received by the receiver 12 using a subset of the three neural networks 14,16,18 to obtain a plurality of sequential outputs, with each sequential output indicative of a predictive determination of an aspect of the corresponding sequential input data event. The processor 20 is configured to process the plurality of sequential outputs to determine an uncertainty value associated with the plurality of sequential outputs. The processor 20 is configured to operate the system 10 based on the determined uncertainty value.

Figure 2:
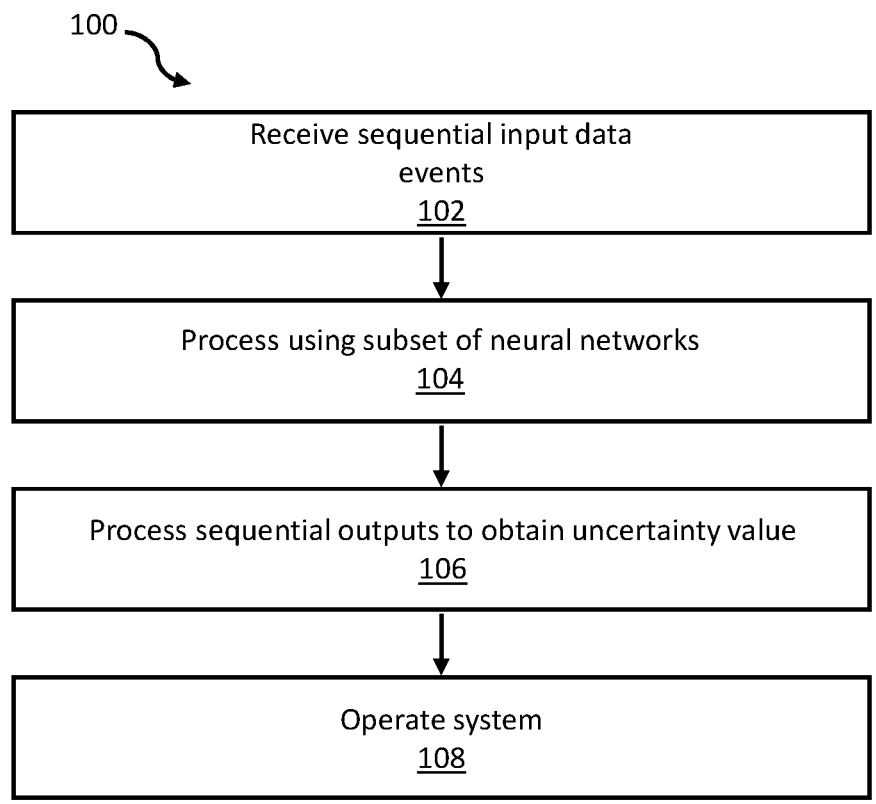
FIG. 2 is a flow diagram illustrating a method of operating the system of FIG. 1 according to an example.

A method 100 in accordance with the system 10 of FIG. 1 is illustrated schematically in FIG. 2. The method 100 comprises receiving 102 sequential input data events, and processing 104 each sequential input data event using a subset of the three neural networks 14,16,18 to obtain a plurality of sequential outputs. Each sequential output is indicative of a predictive determination of an aspect of the corresponding sequential input data event. The method 100 comprises processing 106 the plurality of sequential outputs to determine an uncertainty value associated with the plurality of sequential outputs, for example an uncertainty value associated with each of the plurality of sequential outputs, and operating 108 the system 10 based on the determined uncertainty value.

Figure 3:
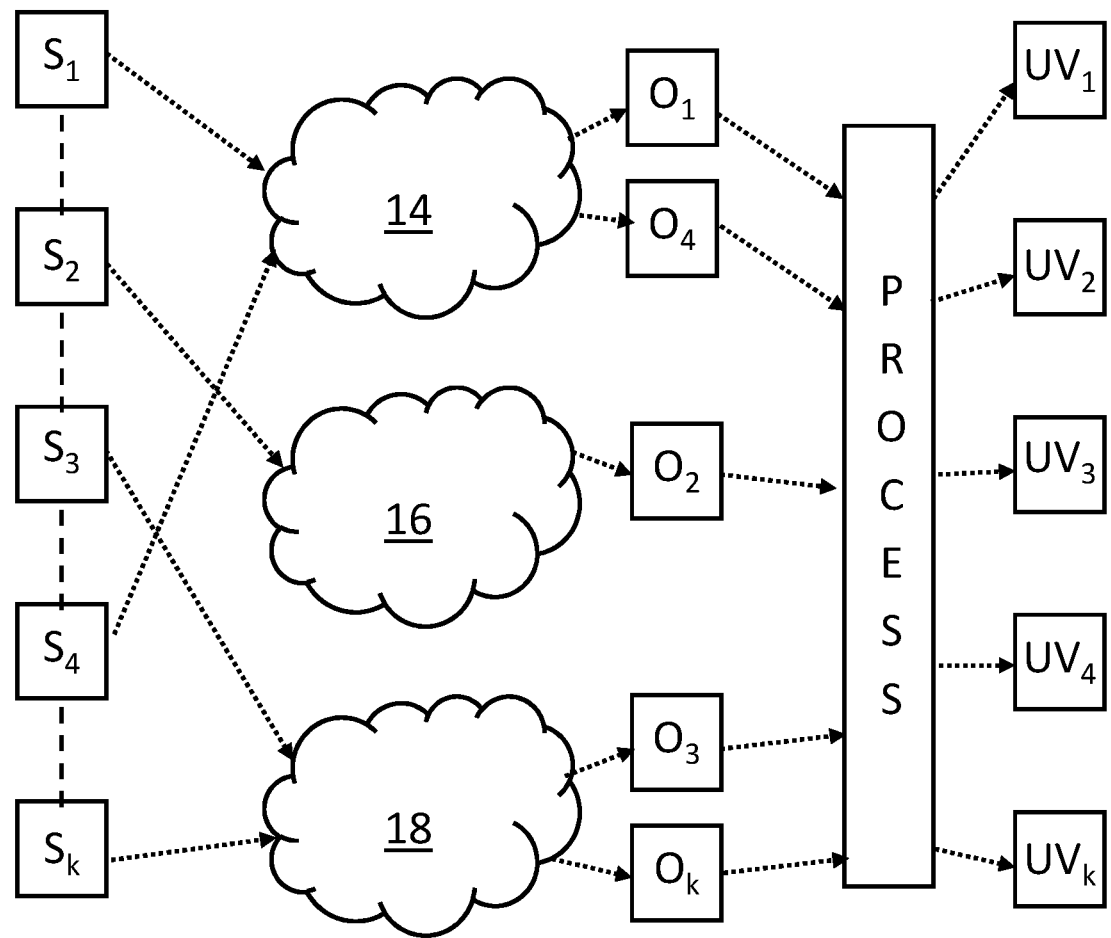
FIG. 3 is a schematic illustration of the method of FIG. 2.

Operation of the system 10 of FIG. 1 and performance of the method 100 of FIG. 2 can be further illustrated as shown in FIG. 3. Here sequential input data events $S_1$-$S_k$ are received. The first input data event $S_1$ is processed by the first neural network 14 to give a first output $O_1$ indicative of a predictive determination of an aspect of the first input data event $S_1$. The second input data event $S_2$ is processed by the second neural network 16 to give a second output $O_2$ indicative of a predictive determination of an aspect of the second input data event $S_2$. The third input data event $S_3$ is processed by the third neural network 18 to give a third output $O_3$ indicative of a predictive determination of an aspect of the third input data event $S_3$. The fourth input data event $S_4$ is processed by the first neural network 14 to give a fourth output $O_4$ indicative of a predictive determination of an aspect of the fourth input data event $S_4$, and so on. Although illustrated here with the final input data event $S_k$ processed by the third neural network 18, it will be appreciated that this will vary in practice depending on the number of input data events and the number of neural networks. In such a manner the processing of the sequential input data events $S_1$-$S_k$ is conducted by the neural networks 14,16,18 to give outputs $O_1$-$O_k$, with different neural networks 14,16,18 processing the sequential input data events at any one time, and the processing cycling through the neural networks 14,16,18.

Collectively the outputs $O_1$-$O_k$ can be thought of as sequential outputs. The outputs $O_1$-$O_k$ are processed to obtain an uncertainty value, and examples of such processing will be described hereafter.

It will be appreciated that the concepts described in relation to FIGS. 1, 2 and 3 can be extended to any number of neural networks N, with any number of received sequential input data events $S_k$ processed by using different neural networks in the cyclic manner described above. It will be appreciated that processing of the sequential input data events also occurs in a sequential manner. It will also be appreciated that each sequential input data event occurs at a different moment in time, and that, in some examples, each sequential input data event $S_1$-$S_k$ may be provided with a timestamp. In practice, given the nature of the neural networks 14,16,18, it will be appreciated that each output $O_1$-$O_k$ will likely be a group of probability distributions for the predictive determination of the aspect of the corresponding input data event $S_1$-$S_k$.

In some examples, such as the examples of FIGS. 2-3, the method according to the present disclosure comprises cycling through a sequence of subsets of the plurality of neural networks to process each sequential input data event. In some examples, such as the examples of FIGS. 2-3, the method according to the present disclosure comprises processing each adjacent sequential input data event using a different subset of the plurality of neural networks to obtain the plurality of sequential outputs.

In some examples, such as the example of FIG. 3, each subset of the plurality of neural networks comprises a single neural network. It will be appreciated that examples in which more than one neural network but less than the totality of the neural networks, ie a subset having cardinality of greater than 1 but less than N, are also envisaged, and that such examples still provide a reduction in computing requirement for processing any given sequential input data event. It will, however, be recognised that using only a single neural network to process each sequential input data event may provide a greater reduction in computing requirement than using more than one neural network to process each sequential input data event.

To further put the examples of FIGS. 1-3 into context, let us consider an example in which the system 10 is an autonomous vehicle system having a camera for capturing sequential image frames, and three neural networks for classifying at least a portion of the sequential image frames. It will be appreciated that autonomous vehicles may be required to detect objects in received image frames with a high degree of accuracy to avoid occurrence of accidental collisions. It may also be desirable for a degree of uncertainty with the object detection to be known, such that the autonomous vehicle can take appropriate action, for example by slowing down and/or stopping when an object is detected with a degree of uncertainty above a pre-determined threshold.

As an example, the camera of the autonomous vehicle may capture a sequence of image frames in which a traffic light is present, and the neural networks may be configured to classify whether the traffic light is red, amber, or green. Here, the method 100 may comprise capturing sequential image frames using a camera or other input sensor of the system 10.

In conventional ensembling used to provide an estimate of uncertainty, each of the three neural networks is run on each image frame to classify whether the traffic light is red, amber, or green, with the outputs of each neural network processed to determine an uncertainty value. Illustrative outputs for conventional ensembling in this case are shown in FIG. 4. Here the uncertainty value is simply taken as the range of probabilities for a classification for a given image frame. For example, in FIG. 4 the probability of a red light in a first image frame is 0.98 according to a first neural network, 0.98 according to a second neural network, and 0.95 according to third neural network, giving an uncertainty spread of 0.03 as to whether the light is red. The probability of a red light in a third image frame, in which the red light is obscured, for example by a tree branch blowing across the light or similar, is 0.85 according to the first neural network, 0.10 according to the second neural network, and 0.00 according to the third neural network, giving an uncertainty spread of 0.85 as to whether the light is red.

For this conventional ensembling, each of the three neural networks is run on each image frame, which may either require a large amount of computing power if the three networks are run simultaneously, or result in latency if there is not sufficient computing power and the three neural works are run sequentially.

This is in contrast an autonomous vehicle implementing the method 100 according to the present disclosure, in which a subset of the three neural networks is run on a given image frame. Illustrative outputs for a method 100 according to the present disclosure, in which a single neural network is run on a given image frame, are shown in FIG. 5.

In FIG. 5 the probability of a red light in a first image frame is 0.98 according to a first neural network, the probability of a red light in a second image frame is 0.97 according to a second neural network, and the probability of a red light in a third image frame, in which the red light is obscured, is 0.00 according to a third neural network. This gives an uncertainty spread of 0.98 across the three image frames. The probability values mentioned here can be utilised to determine an uncertainty value associated with the outputs, as will be described hereafter, and the comparison of FIGS. 4 and 5 is simply intended to illustrate that the method 100 according to the present invention utilises fewer neural networks per image frame, thereby reducing the computing requirement.

Whilst the example above of an autonomous vehicle and image data has been described, it will be appreciated that the method of the present disclosure is applicable more generally to other scenarios in which sequential input data events are received and in which a measure of uncertainty is desired.

For example, in augmented reality, virtual reality, or mixed-reality settings, the method 100 may be used in vision/sensor pipelines to improve consistency of geometric or depth measurements from input sensors. In edge computing, the method 100 may be applicable wherever time-coherent sequences of data are processed. The method 100 may find further utility anywhere a processing system makes decisions based on time-sequential inputs, such as person detection for a smart doorbell or appliance.

As another example, the method 100 may be useful in an Internet of Things setting, to make uncertainty predictions about time series data, such as vibration or movement data. In medical and wearable device fields, the method 100 may be useful in recognising unusual events such as detecting falling or accidents, or for predicting user activity form motion or audio inputs. In networking, the method 100 may provide uncertainty estimates for predictions of time series events such as network packet analysis.

It will be appreciated from the above that image processing is just one example in which the method 100 finds utility.

In some examples, the method 100 comprises receiving a plurality of sets of sequential input data events via a plurality of data sources, and processing each set of sequential input data events using a corresponding subset of the three neural networks 14,16,18 to obtain a plurality of sequential outputs.

For example, an autonomous vehicle may comprise multiple imaging sources, such as multiple cameras or a camera and a LIDAR sensor for example, through which different sets of sequential input data events are received. Whereas for conventional ensembling each of the three neural networks 14,16,18 may be used to process each sequential input data event of each set of sequential input data events, the method 100 described herein may only use a subset, for example one, of the three neural networks 14,16,18, to process each input data event of each set of sequential input data events.

For example, where the system 10 comprises first and second cameras, first image frames captured at the same time by the first and second cameras may be processed by the first 14 and second 16 neural networks only, respectively. Second image frames captured by the first and second cameras may be processed by the second 16 and third 18 neural networks only, respectively, and so on. This may reduce a computing requirement compared to an example where all neural networks process each input data event for multiple data sources.

Figure 6:
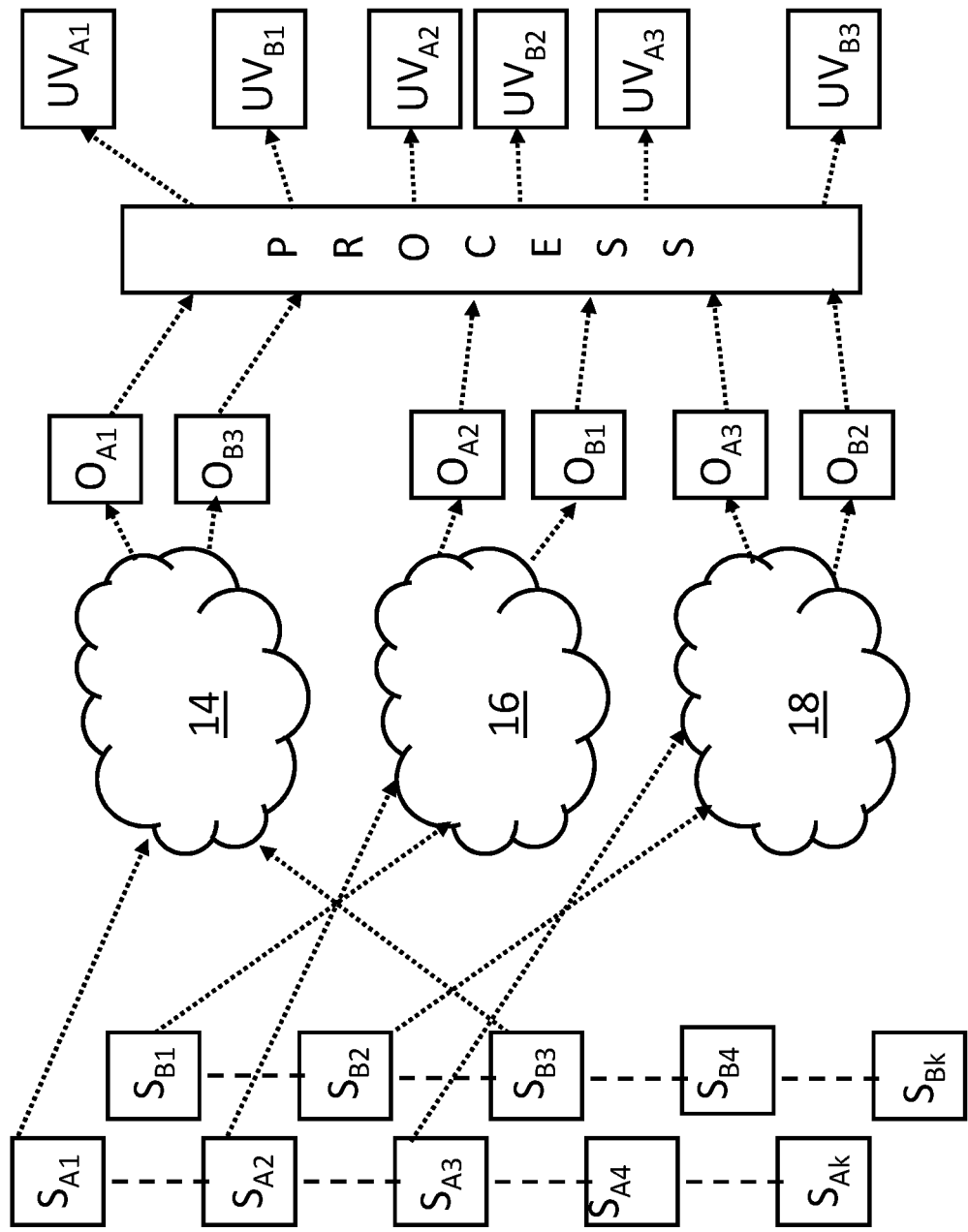
FIG. 6 is a schematic illustration of a further example of the method of FIG. 2.

This is illustrated in FIG. 6, where $S_{A1-Ak}$ represent image frames captured by a first camera, and $S_{B1-Bk}$ represent image frames captured by a second camera. A first image frame $S_{A1}$ captured by the first camera is processed by the first neural network 14, whilst a first image frame $S_{B1}$ captured by the second camera is processed by the second neural network 16. A second image frame $S_{A2}$ captured by the first camera is processed by the second neural network 16, whilst a second image frame $S_{B2}$ captured by the second camera is processed by the third neural network 18, and so on. Outputs $O_{A1-Ak}$, $O_{B1-Bk}$ are processed to determine uncertainty values associated with the respective captured image frames $S_{A1-Ak}$, $S_{B1-Bk}$ in the manner previously described.

In some examples, the method 100 comprises processing each set of sequential input data events using a different corresponding subset of the plurality of neural networks 14,16,18.

As previously discussed, the method 100 processing 104 the plurality of sequential outputs to determine an uncertainty value associated with the plurality of sequential outputs, and that processing may take many forms.

In some examples, the processing 104 comprises any of determining a mean absolute error in the plurality of sequential outputs, determining a mean squared error in the plurality of sequential outputs, determining an entropy value associated with the plurality of sequential outputs, determining a standard deviation of the plurality of sequential outputs, and determining an average value of the plurality of sequential outputs. These techniques will be familiar and well-understood to a person skilled in the art, and so will not be described here for the sake of brevity.

Figure 7:
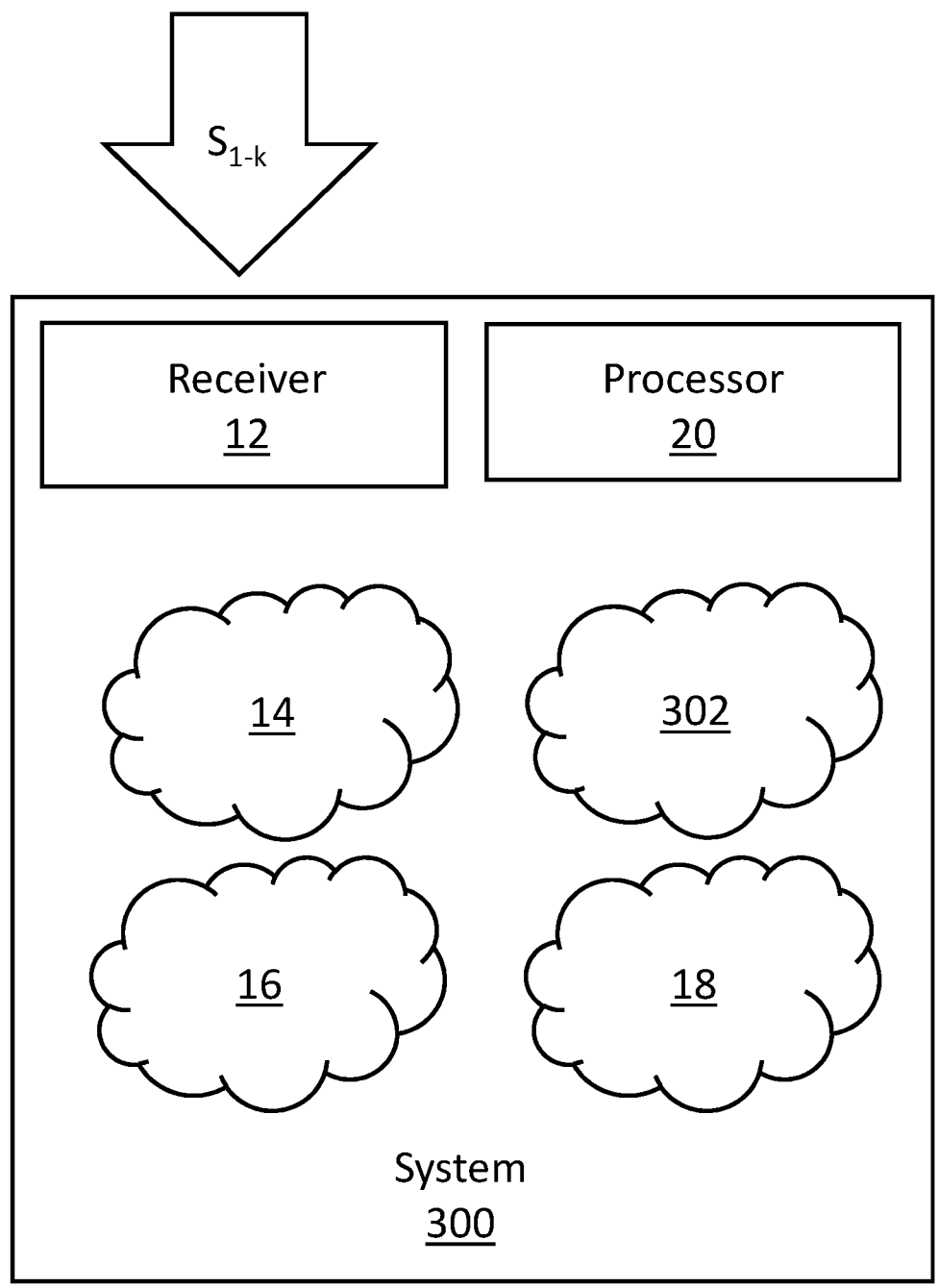
FIG. 7 is a schematic illustration of a system according to a further example.

In some examples, the processing 104 comprises processing the plurality of sequential outputs using a further neural network to determine the uncertainty value associated with the plurality of sequential outputs. A system 300 comprising such a further neural network 302 is illustrated schematically in FIG. 7, where like reference numerals for components also present in FIG. 1 are used for consistency.

The further neural network 302 is smaller than any of the three neural networks 14,16,18, in view of the requirement to process probability values rather than say image frames or other input data events which have significantly more detail, and the computing requirements of the further neural network 302 may be negligible compared to the computing requirements of any one of the neural networks 14,16,18. For example, the further neural network 302 may have fewer neurons and/or fewer connections than any one of the three neural networks 14,16,18. The further neural network 302 takes the sequential outputs of the three neural networks 14,16,18, and processes the sequential outputs to determine the uncertainty value associated with the sequential outputs. In particular, the further neural network 302 is configured to predict an uncertainty value for each of the plurality of sequential outputs based on a sequence defined by the sequential outputs.

The configuration of the further neural network 302, ie the training of the further neural network 302, takes place prior to installation of the further neural network 302 on the system 10, with the further neural network 302 trained using the three neural networks 14,16,18.

Figure 8:
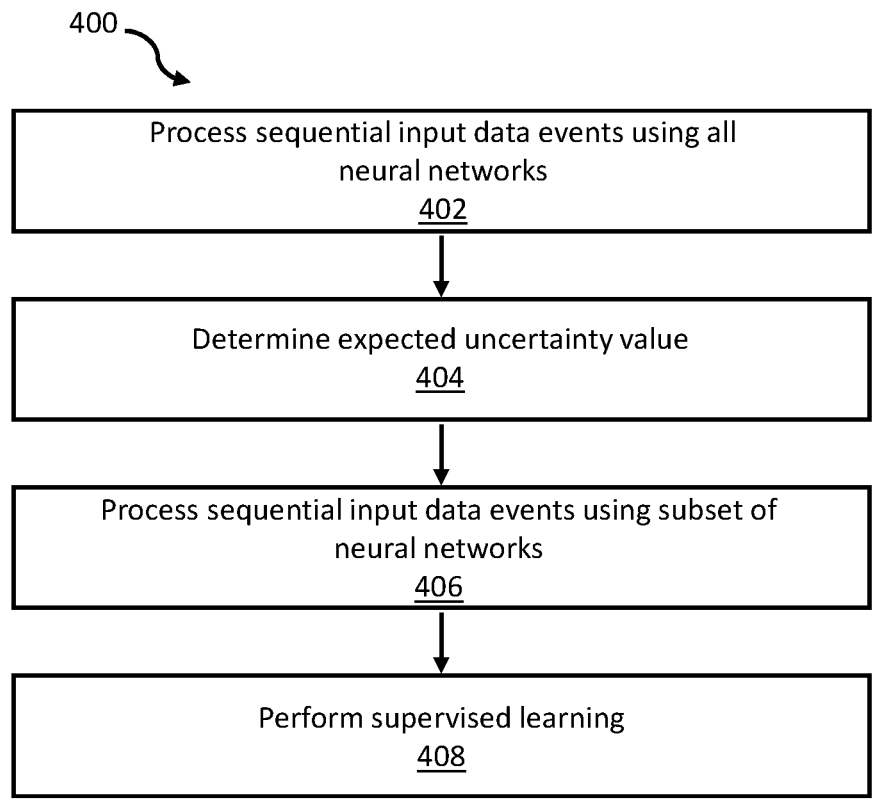
FIG. 8 is a flow diagram illustrating a method of training a further neural network of the system of FIG. 7.

A method 400 of training the further neural network 302, ie a method of training a neural network to provide an uncertainty value for a predictive determination, is illustrated in FIG. 8. The method 400 comprises processing 402 sequential training input data events using the three neural networks 14,16,18 to obtain a first set of sequential outputs, with each sequential training input data event processed using each of the three neural networks 14,16,18, and each sequential output of the first set of sequential outputs indicative of a predictive determination of an aspect of the corresponding sequential training input data event according to each of the three neural networks 14,16,18. The three neural networks 14,16,18 have been previously trained, for example previously trained to make predictive determinations for the data type of the training input data events, and may be referred to as "previously-trained" neural networks in the context of training the further neural network 302.

The method 400 comprises determining 404 an expected uncertainty value associated with each of the sequential outputs of the first set of sequential outputs. This may be done in any appropriate manner as described previously, and the initial steps of processing 402 and determining 404 may be similar to known methods of ensembling.

The method 400 comprises processing 406 the plurality of sequential training input data events using a corresponding subset of the three neural networks 14,16,18 to obtain a second set of sequential outputs, with each sequential output of the second set of sequential outputs indicative of a predictive determination of an aspect of the corresponding sequential training input data event according to the corresponding subset of the three neural networks 14,16,18.

The method 400 comprises performing 408 supervised learning on the further neural network 302 by utilising the second set of sequential outputs as input data for the further neural network 302, and utilising the expected uncertainty values associated with each of the sequential outputs of the first set of sequential outputs as a target output, such that the further neural network 302 outputs an uncertainty value for each sequential output of the second set of sequential outputs.

Although described in order in the method 400 above, the steps of processing 402 sequential training input data events using the three neural networks 14,16,18, and processing 406 the plurality of sequential training input data events using a corresponding subset of the three neural networks 14,16,18 may be performed in any order to generate the target outputs and inputs for the further neural network 302 respectively.

Weights and biases of the further neural network 302 are adjusted during training such that, for a given sequence of the second set of sequential outputs, the further neural network 302 outputs an uncertainty value for a given one of sequential training input data events that closely matches the expected uncertainty value associated with the corresponding sequential output of the first set of sequential outputs for that given sequential training data input event. In other words, the further neural network 302 is trained such that the uncertainty values it outputs closely match the uncertainty values that would be obtained by using conventional ensembling techniques, thereby providing similar results for less computing power in processing the input data events.

The method 400 is further illustrated with reference to FIG. 9. Sequential training input data events $T_1$-$T_k$ are fed to the three neural networks 14,16,18, with each neural network 14,16,18 processing each training input data event $T_1$-$T_k$. For a given input training event k, three output values $O_{k,1}$-$O_{k,3}$ are received, with these output values collectively grouped as one output E of the first set of sequential outputs as discussed herein. The first set of sequential outputs thereby has a cardinality k corresponding to the number of training input data events. It will be appreciated that each output E is a group of probabilities corresponding to the predictive determinations made by the respective neural networks 14,16,18. Each output $E_1$-$E_K$ of the first set of sequential outputs is processed to determine an expected uncertainty value for the corresponding training input data event $T_1$-$T_k$, with the collection of expected uncertainty values labelled EUV in FIG. 9.

Sequential training input data events $T_1$-$T_k$ are also fed to the three neural networks 14,16,18 such that only one of the three neural networks 14,16,18 processes any given training input data event $T_1$-$T_k$. The three neural networks 14,16,18 are cycled through when processing the training input data events $T_1$-$T_k$, for example with the first neural network 14 processing the first training data event $T_1$, the second neural network 16 processing the second training data event $T_2$, the third neural network 18 processing the third training data event $T_3$, the first neural network 14 processing the fourth training data event $T_4$, and so on. The outputs of the processing are indicated by $P_1$-$P_k$ in FIG. 9, and it will be appreciated that each output is a group of probability distributions for the predictive determination of the aspect of the corresponding training input data event $T_1$-$T_k$. Collectively, the outputs $P_1$-$P_k$ form a second set of sequential outputs in the context of the description of the method 400 of FIG. 9.

Figure 9:
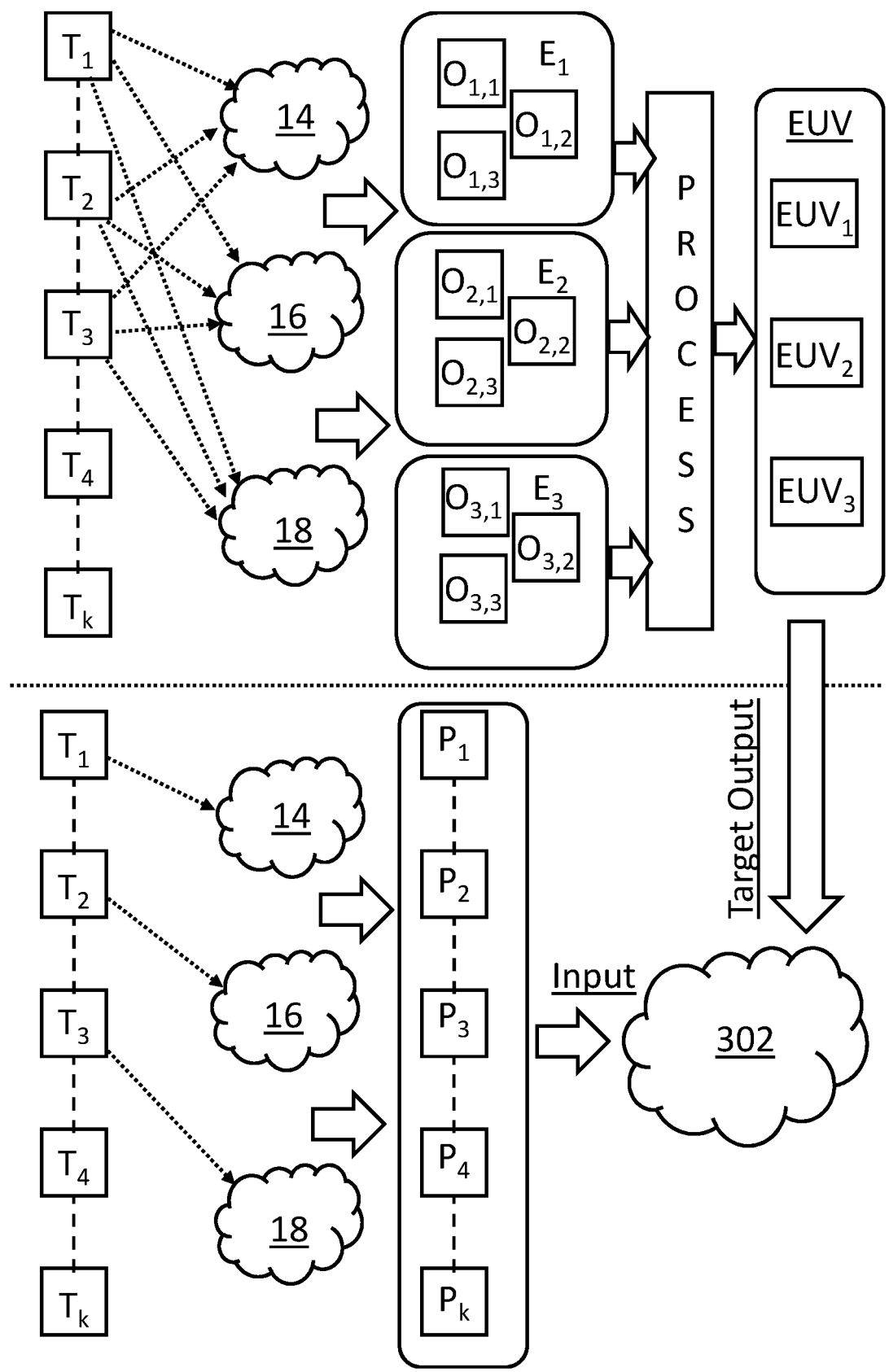
FIG. 9 is a schematic illustration of the method of FIG. 8.

The outputs $P_1$-$P_k$ of the individual processing in FIG. 9 form inputs to be fed to the further neural network 302 during training, whilst the collection of expected uncertainty values labelled EUV in FIG. 9 define target outputs for the further neural network 302, such that supervised learning can be performed. The further neural network 302 is trained such that the uncertainty values it outputs closely match the uncertainty values that would be obtained by using conventional ensembling techniques, thereby providing similar results for less computing power in processing the input data events. In some examples training may take place by providing a stateful model with output for each input data event, or by providing the previous N outputs for each input data event, for example.

Once trained in the manner described with reference to FIGS. 8 and 9, the further neural network 302 may be deployed in the system 10 as previously described.

It will be appreciated that the concepts described in relation to FIGS. 8 and 9 can be extended to any number of neural networks, with any number of received sequential input data events $S_k$ processed in the manner described above to train the further neural network 302.

Figure 10:
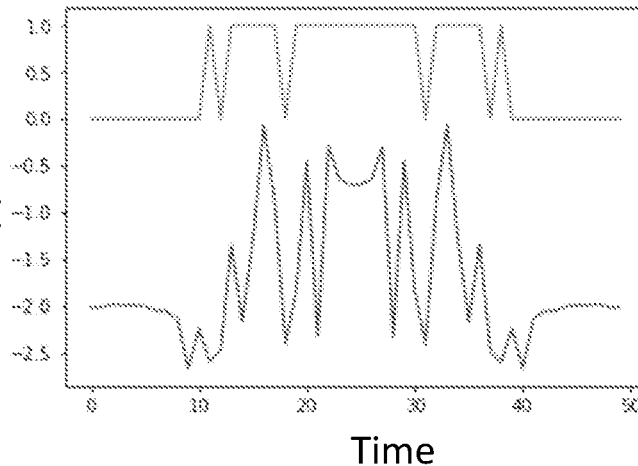
FIG. 10 shows illustrative graphs of results obtained via conventional ensembling compared to results obtained via the method of FIG. 2.
Figure 10:
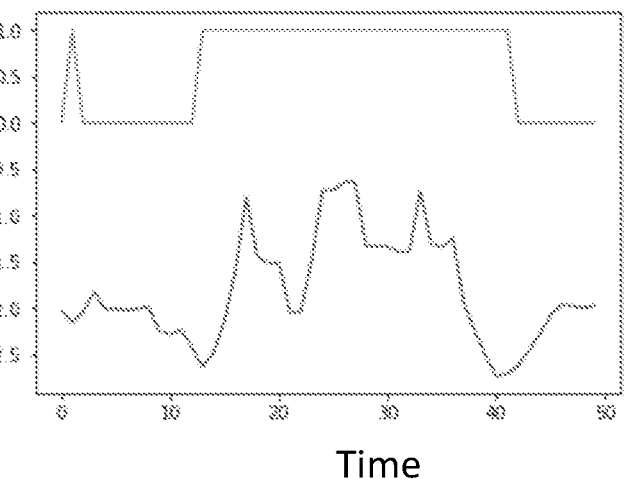

A comparison between the outputs of conventional ensembling and the method described above with reference to FIGS. 8 and 9 is shown in FIG. 10. As can be seen, for conventional ensembling, the accuracy of prediction is worse, and the uncertainty value associated with a prediction is noisier, compared to the respective accuracy and uncertainty values obtained when utilising the method as described herein.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of operating a system comprising a plurality of neural networks, the method comprising:
   receiving sequential input data events derived from data captured by an input sensor, each sequential input data event representing an output of the input sensor at a respective different time;
   processing each sequential input data event using a subset of the plurality of neural networks to obtain a plurality of sequential outputs, each sequential output indicative of a respective predictive determination of an aspect of the corresponding sequential input data event, wherein adjacent sequential input data events are processed using different subsets of the plurality of neural networks;
   processing the plurality of sequential outputs to:
      determine a prediction of the aspect across the sequential input data events based on the respective predictive determinations of the aspect indicated in each of the plurality of sequential outputs; and
      determine an uncertainty value associated with the prediction of the aspect across the sequential input data events; and
   operating the system based on the determined uncertainty value,
   wherein operating the system comprises controlling the system to take a predetermined action based on the determined uncertainty value.

2. A method as claimed in claim 1, wherein the method comprises cycling through a sequence of subsets of the plurality of neural networks to process each sequential input data event.

3. A method as claimed in claim 1, wherein each subset of the plurality of neural networks comprises a single neural network.

4. A method as claimed in claim 1, wherein processing the plurality of sequential outputs to determine an uncertainty value associated with the plurality of sequential outputs comprises any of determining a mean absolute error in the plurality of sequential outputs, determining a mean squared error in the plurality of sequential outputs, determining an entropy value associated with the plurality of sequential outputs, determining a standard deviation of the plurality of sequential outputs, determining an average value of the plurality of sequential outputs, and processing the plurality of sequential outputs using a further neural network.

5. A method as claimed in claim 4, wherein the further neural network is trained using the plurality of neural networks prior to installation on the system.

6. A method as claimed in claim 4, wherein the further neural network is smaller than any of the plurality of neural networks.

7. A method as claimed in claim 4, wherein the further neural network is configured to predict an uncertainty value for each of the plurality of sequential outputs based on a sequence defined by the plurality of sequential outputs.

8. A method as claimed in claim 1, wherein the sequential input data events comprise sequential image frames, and each sequential output is indicative of classification of at least a portion of the corresponding sequential image frame.

9. A method as claimed in claim 1, wherein the method comprises receiving a plurality of sets of sequential input data events via a plurality of data sources, and processing each set of sequential input data events using a corresponding subset of the plurality of neural networks to obtain a plurality of sequential outputs.

10. A method as claimed in claim 9, wherein the method comprises processing each set of sequential input data events using a different corresponding subset of the plurality of neural networks.

11. A method as claimed in claim 9, wherein the method comprises processing each input data event within a set of sequential input data events using a different corresponding subset of the plurality of neural networks.

12. A system comprising:
   a receiver for receiving sequential input data derived from data captured by an input sensor, each sequential input data event representing an output of the input sensor at a respective different time;
   a plurality of neural networks; and
   a processor configured to:
      process each received sequential input data event using a subset of the plurality of neural networks to obtain a plurality of sequential outputs, each sequential output indicative of a respective predictive determination of an aspect of the corresponding sequential input data event, wherein adjacent sequential input data events are processed using different subsets of the plurality of neural networks;
      process the plurality of sequential outputs to:
         determine a prediction of the aspect across the sequential input data events based on the respective predictive determinations of the aspect indicated in each of the plurality of sequential outputs; and
         determine an uncertainty value associated with the prediction of the aspect across the sequential input data events; and
      operate the system based on the determined uncertainty value,
   wherein operating the system comprises controlling the system to take a predetermined action based on the determined uncertainty value.

13. A system as claimed in claim 12, wherein the receiver comprises an image capture apparatus, and the sequential input data events comprise sequential image frames captured by the image capture apparatus.

14. A system as claimed in claim 12, wherein the system comprises a further neural network, and the controller is configured to control the processor to process the plurality of sequential outputs using the further neural network to determine the uncertainty value associated with the plurality of sequential outputs.

15. A system as claimed in claim 14, wherein the further neural network is smaller than any of the plurality of neural networks.

16. A system as claimed in claim 14, wherein the further neural network is configured to predict an uncertainty value for each of the plurality of sequential outputs based on a sequence defined by the plurality of sequential outputs.

17. A system as claimed in claim 12, wherein each subset of the plurality of neural networks comprises a single neural network.

\* \* \* \* \*